Dec. 3, 1968    J. M. FOLZ    3,414,482
PREVENTING FRACTIONATOR REBOILER FOULING
Filed Aug. 1, 1966    2 Sheets-Sheet 1

INVENTOR
J. M. FOLZ
BY *Young & Quigg*
ATTORNEYS

Dec. 3, 1968   J. M. FOLZ   3,414,482
PREVENTING FRACTIONATOR REBOILER FOULING
Filed Aug. 1, 1966   2 Sheets-Sheet 2

INVENTOR
J. M. FOLZ
BY Young & Quigg
ATTORNEYS

United States Patent Office 3,414,482
Patented Dec. 3, 1968

3,414,482
PREVENTING FRACTIONATOR
REBOILER FOULING
John M. Folz, Bartlesville, Okla., assignor to Phillips
Petroleum Company, a corporation of Delaware
Filed Aug. 1, 1966, Ser. No. 569,333
3 Claims. (Cl. 203—2)

ABSTRACT OF THE DISCLOSURE

Method for preventing fouling of a reboiler supplying heat for a fractionating column comprising withdrawing a side stream comprising vapors from an intermediate portion of the column, pressuring and heating the side stream, and introducing the pressured and heated side stream into the reboiler section of the column to directly heat bottoms liquid therein.

---

This invention relates to a method for preventing reboiler fouling of a fractionating column.

In another aspect, the invention relates to a method of reboiling a fractionating column by indirectly heating vapors withdrawn from the column either above or below the point at which feed is introduced into the column, and introducing said vapors into the kettle section of the column.

In another aspect, the invention relates to a method of preventing the deposition of insoluble materials in the kettle section of a fractionating column by withdrawing vapor from the side of the column, pressuring and heating said vapor, and introducing said vapor into the kettle section of the column as a source of reboil heat.

In still another aspect, the invention relates to a method of controlling the feed to a constant speed compressor used in compressing vapors withdrawn from the fractionator column in inverse relation to the temperature in the kettle section of the column.

The manufacture of rubber from diene monomers in the presence of solvent usually involves recycling the solvent to the polymerization reactor after fractionation of the solvent. Such solvent usually contains some entrained particles of rubber which deposit in the kettle section of the fractionating column when the column is reboiled directly.

It is an object of this invention to reboil a fractionating column indirectly to prevent fouling in the kettle section and reboiler of the column. It is also an object of this invention to maintain a relatively constant flow of heat to the fractionating column in order to reboil said column.

In another aspect, the invention relates to a method of reboiling a fractionating column by heating liquid withdrawn from the column either above or below the point at which the feed is introduced into the column, said liquid containing sufficient solvent to maintain entrained polymer in solution, and introducing said liquid into the kettle section of the column.

Other aspects, objects and the several advantages of the invention will become apparent to one skilled in the art upon studying the drawings, specification, and appended claims.

The invention comprises a method for preventing reboiler fouling caused by direct heating of bottoms liquid of a fractionating column by withdrawing a stream from said column, compressing and heating said stream, and introducing the stream into the kettle section of the column as the source of reboiler heat. The stream withdrawn can contain vapors substantially completely free of polymer, liquid containing sufficient solvent to maintain entrained polymer in solution, or a mixture thereof. When a constant speed compressor is used to compress the withdrawn vapor, it is important to control the withdrawal of vapor from the column in response to the temperature of the kettle section of the column. Thus, as the temperature of the kettle section increases, a proportionately smaller amount of heat is needed to reboil the column, and the flow to the compressor is proportionately reduced.

Referring now to the drawings.

Figure 1:
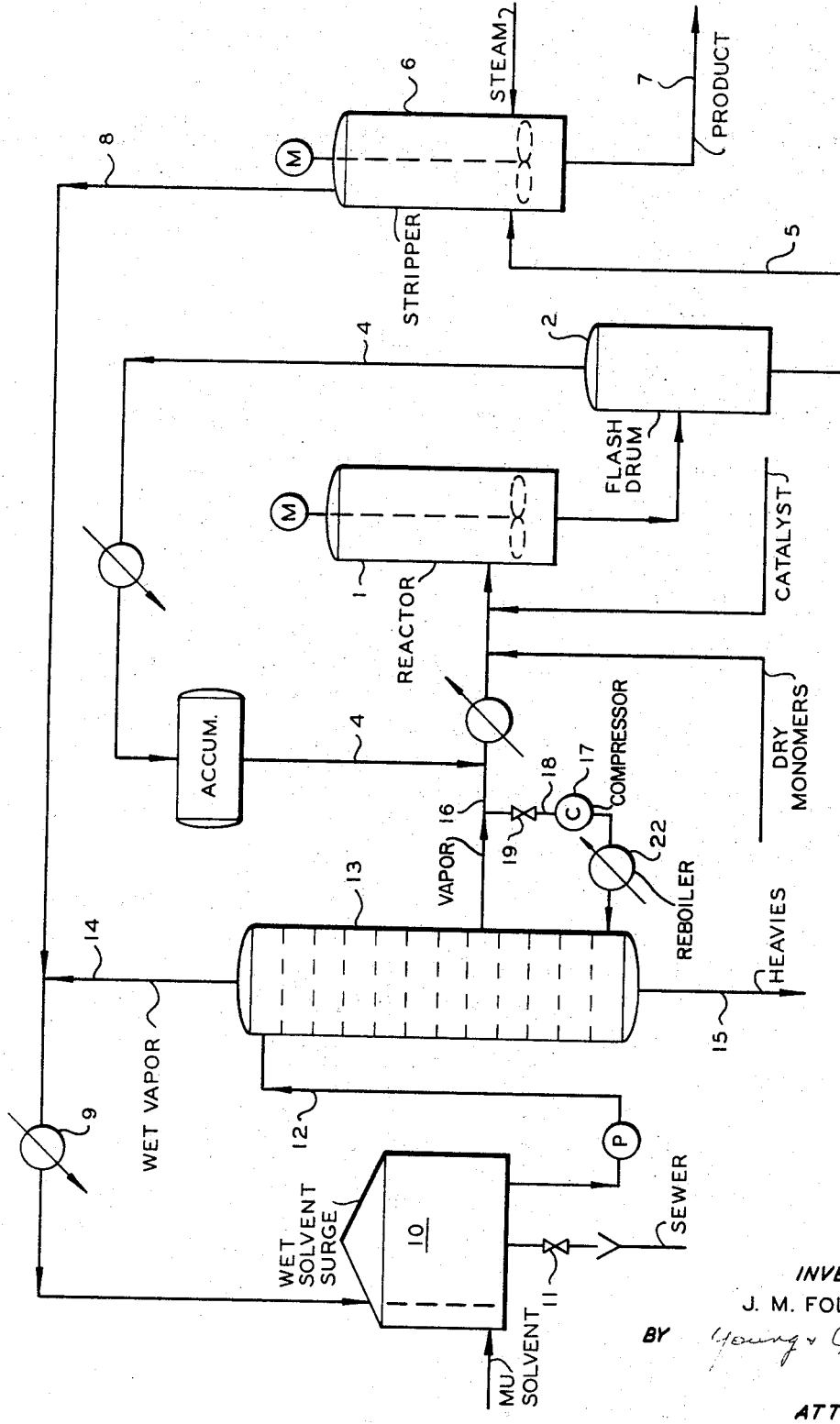
FIGURE 1 shows a diagram of an apparatus suitable for polymerizing diene monomer in the presence of a solvent, including a fractionating column suitable for the practice of the invention.
Figure 2:
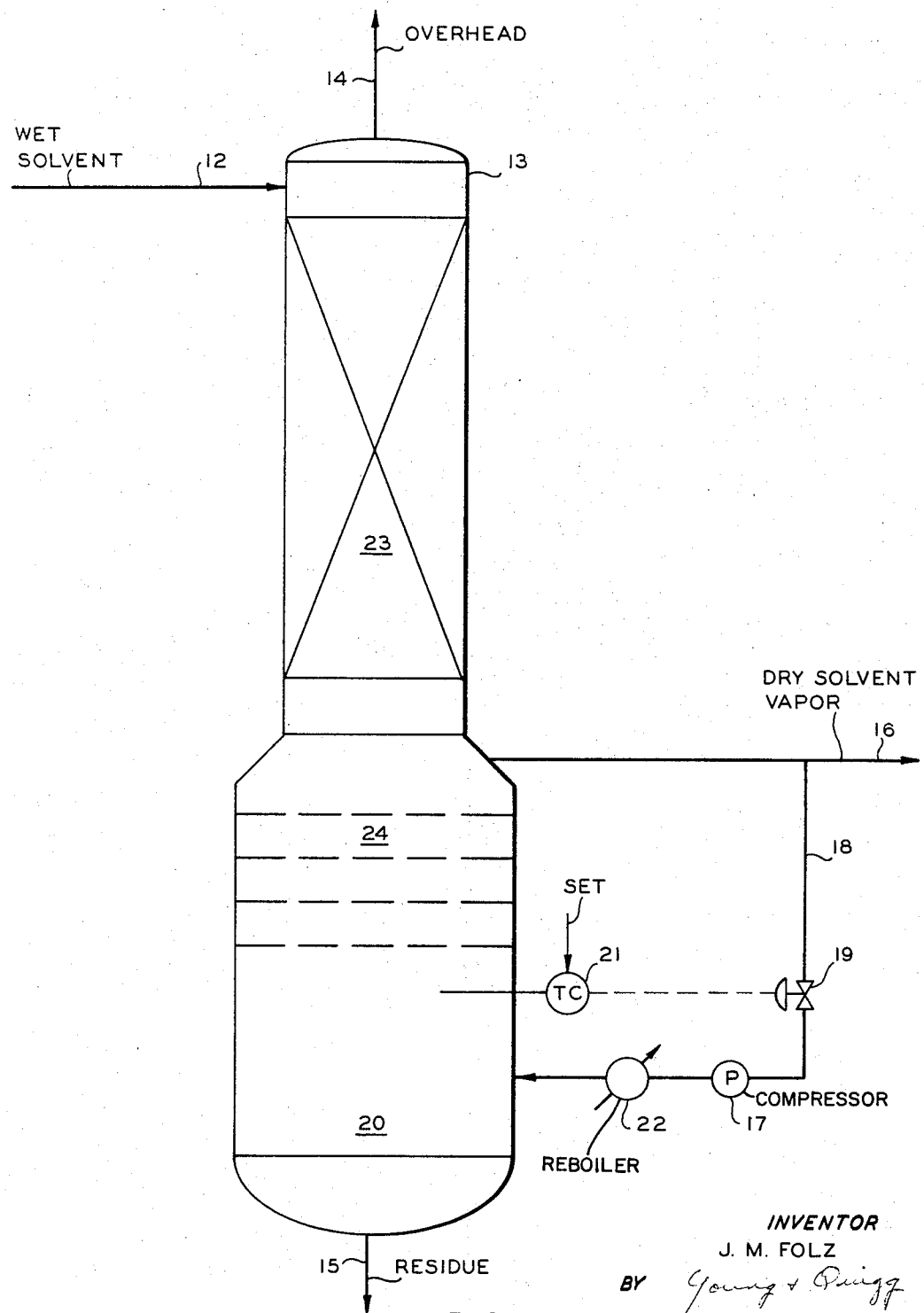
FIGURE 2 shows a side elevation of a fractionating column illustrating an application of the invention.

In FIGURE 1, diene monomer (or monomers such as butadiene and styrene), a suitable catalyst, and a solvent such as cyclohexane, toluene, or normal hexane are fed to polymerization reactor 1, in which the diene is polymerized. From there, the mixture passes to flash drum 2, from which polymer in solvent 5 and wet solvent containing entrained polymer particles 4 issue. The wet solvent passes to stripper vessel 6, from which product 7 is removed for further processing, and additional solvent (plus steam) is removed by way of 8, cooled and condensed in 9, along with wet vapors 14, subsequently referred to, and charged to wet solvent storage 10. Water is removed by way of 11. Wet liquid solvent is pumped by way of line 12 to solvent drying column 13 from which some solvent including substantially all the water (as vapor) is removed overhead by way of line 14, and a residual stream containing polymer removed by way of 15. FIGURE 2 shows column 13 in detail wherein the wet feed is shown added as liquid to the top of the drying column, requiring no column liquid reflux, other than the feed. The tower could have liquid reflux with the feed added below the reflux, and the vapor for reboil could be removed from the tower to locus above the feed, but below the reflux entry, not shown.

FIGURE 2 shows wet solvent entering fractionating column 13 through line 12. In the column, some solvent and the water are vaporized and removed via line 14. Substantially completely dried hydrocarbon vapor, free of polymer, is withdrawn from the column via line 16, which is below the feed line. This vapor stream has no polymer particles therein. This vapor is fed to constant speed compressor 17 via line 18 through valve 19, which controls the rate of flow in response to the temperature of kettle section 20 as measured by temperature controller 21. If the temperature of the kettle section rises above the predetermined level, which can be fixed by suitably adjusting the temperature controller, the flow through valve 19 is restricted by a signal from the controller until the temperature of the kettle section returns to the predetermined level. If the temperature in the kettle section falls below the predetermined level, the valve is opened wider to permit more heated vapor to reach the kettle. The vapors issuing from compressor 17 are heated in heater 22, and flow into kettle section 20 as a source of reboil heat for the column.

It is apparent that the invention facilitates reboiling of column 13 directly at a substantially constant, predetermined, temperature level, and prevents the formation of insoluble material in the reboiler 22, and in the kettle section 20 which would result from direct reboiling of polymer-containing residue of the column. A polymer-containing fluid contacting the hot surfaces of the heat exchanger will deposit a film of polymer on the hot surface. This film, of course, fouls the heat exchanger. Those skilled in the art will appreciate that the invention is applicable to the fractionation of any material in which the problem of reboiler fouling arises. Further, the flow of heat to the kettle section and the temperature level of the section can be easily controlled and varied by the practice of this invention.

It is noted that tower 13, in FIGURE 2, has an upper portion 23 containing contact material, e.g., Raschig rings, and the lower portion 24 has contact trays, such as sieve trays. Side vapor draw 16 is preferably made from the top tray of zone 24 in this operation. Of course, trays can be used throughout the column; a separate reflux can be used; and vapor side draw for reboil can be made from above the feed tray.

Though the description of the drawings refer to withdrawing vapor from a fractionating column, it should be understood that the invention contemplates withdrawal of liquid containing sufficient solvent to maintain entrained polymer in solution, as well as withdrawal of vapors or mixtures thereof.

Although the control of valve 19 in conduit 18, as shown in FIGURE 2, is illustrated as being actuated directly by the temperature controller 21 when vapor alone is withdrawn, this control can be effected as follows when liquid or a mixture of liquid and vapor are withdrawn: temperature controller 21 can be used to reset the set point of a flow control means (not shown) which flow control means measures the flow of fluid in conduit 18 and actuates the control of valve 19.

overhead and polymer as bottoms from said column;
(b) withdrawing from an intermediate portion and below the feed of said fractionation column a side stream comprising solvent vapors substantially free of polymer;
(c) pressuring and additionally heating at least a portion of said side stream in said reboiler by indirect heat exchange to substantially increase its temperature; and
(d) introducing said pressured and heated side stream vapors into the kettle section of said column to directly heat the bottoms liquid therein, the flow rate of said side stream vapors introduced into said column being controlled responsive to the temperature of the residue in the kettle section of said column.

2. A method according to claim 1 wherein said side stream is pressured by being compressed by a constant speed compressor, said stream being fed to said compressor in inverse relationship to the temperature of the reboiler section of the column.

3. A method according to claim 1 wherein said feed stream is a wet solvent stream containing a hydrocarbon selected from cyclohexane, toluene and normal hexane as the solvent component and the polymer is a diene polymer.

EXAMPLE

Tower 13:
Pressure, p.s.i.g. _____ 5
Top temperature, °F. _____ 165
Bottom temperature, °F. _____ 180

| Stream | Weight Percent | | | | |
|---|---|---|---|---|---|
| | Feed (12) | Overhead (14) | Residue (15) | Reboil Solvent (18) | Dried Solvent (16) |
| Component: | | | | | |
| H₂O, p.p.m. | (750) | (7,500) ² | <5 p.p.m. | <5 p.p.m. | <5 p.p.m. |
| Solvent ¹ | 99.7 | 100 | 90 | 100.0 | 100.0 |
| Polymer | 0.3 | | 10 | Nil | Nil. |
| Amount, #/min | 100 | 10 | 3.0 | 435 | 87.0 |

¹ Normal Hexane.
² Substantially all water overhead.
No reboiler fouling occurs.
=pounds.

Reasonable modification and variation are possible within the spirit and scope of the invention, the essence of which is a method of reboiling a fractionating column indirectly to prevent the deposition of insolubles in the kettle section thereof by withdrawing a stream from the column, pressuring and heating said stream, and introducing said stream into the kettle section of the column as the source of reboil heat; said stream can comprise vapors, liquid containing sufficient solvent to maintain entrained polymer in solution, and/or a mixture thereof.

I claim:
1. A method for preventing fouling of a reboiler supplying heat for a fractionating column comprising:
(a) passing a feed stream comprising solvent and polymer to a fractionation column to effect separation of solvent from polymer by removing solvent

References Cited
UNITED STATES PATENTS

| | | | |
|---|---|---|---|
| 2,280,093 | 4/1942 | Kleinschmidt | 203—100 |
| 2,640,018 | 5/1953 | Heath | 203—100 X |
| 2,833,644 | 5/1958 | Avery | 203—100 X |
| 3,084,110 | 4/1963 | Polk | 203—7 |
| 3,269,921 | 8/1966 | Oglesby et al. | 203—2 |
| 3,272,722 | 9/1966 | Walker | 203—2 |
| 3,294,649 | 12/1966 | Powell | 203—100 X |
| 3,340,158 | 9/1967 | Bates | 203—2 |

NORMAN YUDKOFF, *Primary Examiner.*

FOLSOM E. DRUMMOND, *Assistant Examiner.*